(12) United States Patent
Sato et al.

(10) Patent No.: US 8,810,664 B2
(45) Date of Patent: Aug. 19, 2014

(54) IMAGING APPARATUS, IMAGING METHOD AND COMPUTER PROGRAM

(75) Inventors: Hidehiko Sato, Kanagawa (JP); Tetsuji Uezono, Kanagawa (JP); Junzo Sakurai, Kanagawa (JP)

(73) Assignee: AOF Imaging Technology, Co., Ltd., Hong Kong (CN)

( * ) Notice: Subject to any disclaimer, the term of this patent is extended or adjusted under 35 U.S.C. 154(b) by 5 days.

(21) Appl. No.: 13/297,506

(22) Filed: Nov. 16, 2011

(65) Prior Publication Data

US 2012/0127346 A1 May 24, 2012

(30) Foreign Application Priority Data

Nov. 19, 2010 (JP) .................................. 2010-258674

(51) Int. Cl.
 *H04N 5/228* (2006.01)
 *H04N 7/18* (2006.01)
 *H04N 5/272* (2006.01)

(52) U.S. Cl.
 CPC .................................... *H04N 5/272* (2013.01)
 USPC .................................... 348/208.14; 348/143

(58) Field of Classification Search
 USPC ............ 348/208.1, 208.14, 231.99, 372–376, 348/65–67, 143, 169
 See application file for complete search history.

(56) References Cited

U.S. PATENT DOCUMENTS

| 8,026,945 B2* | 9/2011 | Garoutte et al. | 348/143 |
| 8,373,772 B2* | 2/2013 | Takahashi | 348/231.3 |
| 8,493,409 B2* | 7/2013 | Cobb et al. | 345/629 |

FOREIGN PATENT DOCUMENTS

| CN | 101431616 A | 5/2009 |
| JP | 2009-59060 A | 3/2009 |

OTHER PUBLICATIONS

Notification of the First Office Action for Chinese Application No. 201110374795.9; Date of Mailing: Mar. 25, 2013, 11 pages, with English Translation.

* cited by examiner

*Primary Examiner* — Trung Diep
(74) *Attorney, Agent, or Firm* — McClure, Qualey & Rodack, LLP

(57) ABSTRACT

An imaging apparatus according to this invention comprises: an image capturing unit which performs continuous image capturing; a storing unit which stores a plurality of first images captured by the image capturing unit before a shutter button is pushed, and a plurality of second images captured by the image capturing unit after the shutter button is pushed; and a generating unit which generates a background image which is an image of a background of a dynamic body included in the first images and second images based on at least the plurality of first images.

7 Claims, 7 Drawing Sheets

IMAGING APPARATUS, IMAGING METHOD AND COMPUTER PROGRAM

CROSS-REFERENCE TO RELATED APPLICATION

The present application is related to, claims priority from, and incorporates by reference Japanese Patent Application No. 2010-258674 filed on Nov. 19, 2010.

BACKGROUND OF THE INVENTION

1. Field of the Invention

The present invention relates to an imaging apparatus, an imaging method and a computer program.

2. Description of Related Art

Following improvement of performance of image capturing devices such as CMOS (Complementary Metal Oxide Semiconductor) and IC chips which process images taken in by the image capturing devices, the number of images which can be captured per unit time by a continuous image capturing function is increasing. Some digital cameras which are sold in recent years can capture several tens of images per second.

Hence, various functions of a digital camera using a continuous image capturing function are proposed. For example, JP 2009-059060 A discloses a technique of extracting a moving object (dynamic body) by analyzing a plurality of images continuously captured in a short time, and superimposing and composing the dynamic body extracted from each image on one image.

In this technique, a median value image is created which uses as a pixel value of each pixel the median value of a pixel value of a pixel at the same position in a plurality of images obtained by a series of image capturing, and the pixel having a significant difference from the pixel of the median value image among the pixel of each image is replaced with the pixel of the median value image as the image of the dynamic body portion to compose the median value image and the image of the dynamic body portion.

SUMMARY OF THE INVENTION

With the above technique, a median value image is generated using all of a plurality of images obtained by a series of image capturing, and therefore it is natural that a median value image cannot be generated after a series of image capturing is finished. Hence, the user cannot check to which image the dynamic body extracted from each image is composed until a series of image capturing is finished and the median value image is generated.

Further, when the above composition processing is performed using a so-called full image which is an image having the same number of pixels as the number of effective pixels of an image capturing device, each processing requires time, and therefore the image of the composition result cannot be checked for a little while after a series of image capturing is finished.

It is therefore an exemplary object of the present invention to provide an imaging apparatus, an imaging method and a computer program which can more quickly generate an image in which a plurality of dynamic bodies extracted respectively from a plurality of continuously captured images are composed.

According to an exemplary aspect of the present invention, an imaging apparatus has: an image capturing unit which performs continuous image capturing; a storing unit which stores a plurality of first images captured by the image capturing unit before a shutter button is pushed, and a plurality of second images captured by the image capturing unit after the shutter button is pushed; and a generating unit which generates a background image which is an image of a background of a dynamic body included in the first images and second images based on at least the plurality of first images.

According to another aspect of the present invention, an imaging method includes: performing continuous image capturing; storing a plurality of first images captured before a shutter button is pushed and a plurality of second images captured after the shutter button is pushed; and generating a background image which is an image of a background of a dynamic body included in the first images and second images, based on at least the plurality of first images.

According to another aspect of the present invention, a computer program causing a computer to execute processing including: performing continuous image capturing; storing a plurality of first images captured before a shutter button is pushed and a plurality of second images captured after the shutter button is pushed; and generating a background image which is an image of a background of a dynamic body included in the first images and second images, based on at least the plurality of first images.

According to the present invention, it is possible to generate more quickly an image in which a plurality of dynamic bodies extracted respectively from a plurality of continuously captured images are composed.

BRIEF DESCRIPTION OF THE DRAWINGS

Specific embodiments of the present invention will now be described, by way of example only, with reference to the accompanying drawings in which.

DETAILED DESCRIPTION OF THE PREFERRED EMBODIMENTS

Figure 1:
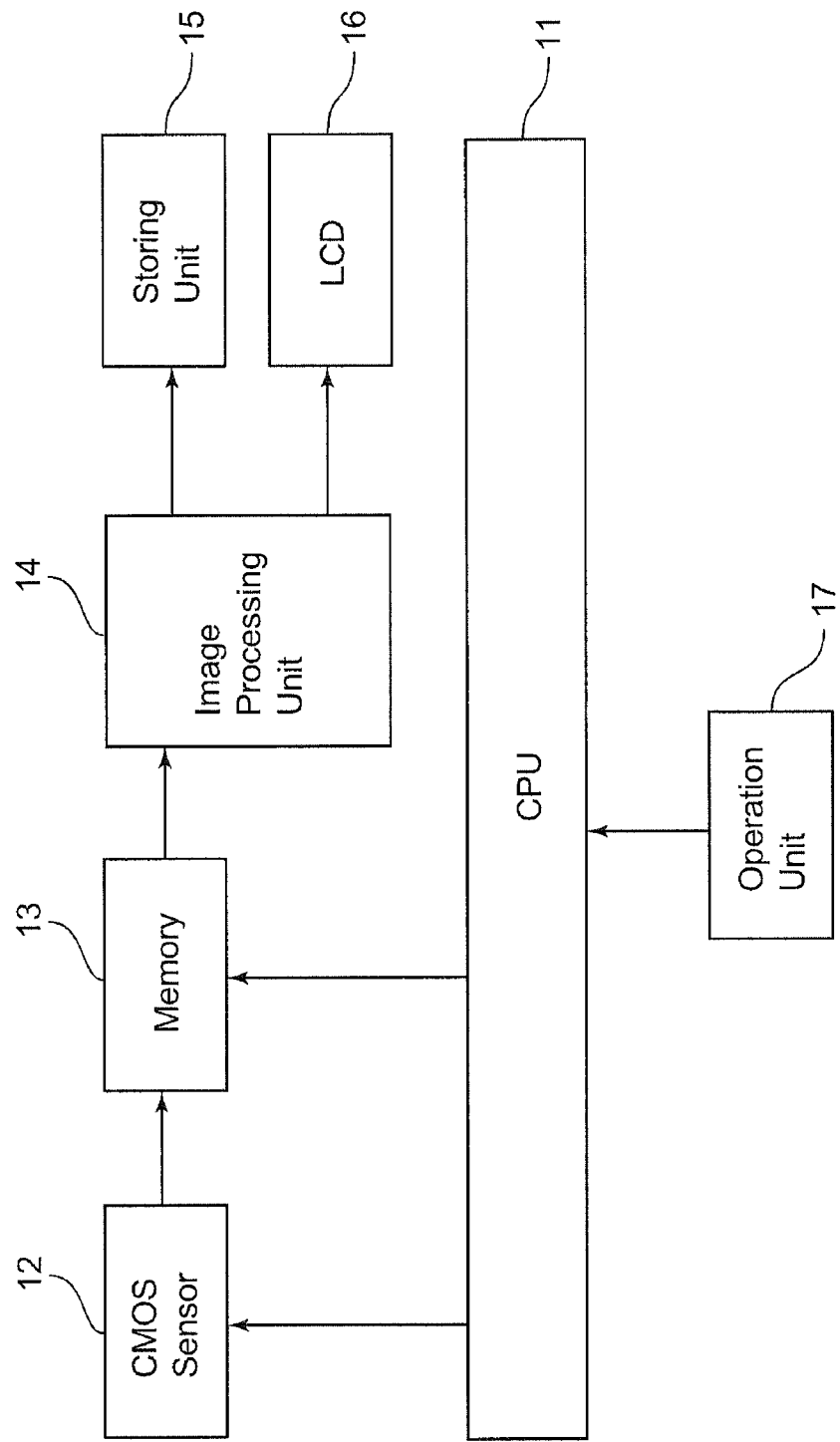
FIG. 1 is a block diagram illustrating a configuration example of an imaging apparatus according to an exemplary embodiment.

FIG. 1 is a block diagram illustrating a configuration example of an imaging apparatus 1 according to an exemplary embodiment. The imaging apparatus 1 is an apparatus such as a digital still camera, digital video camera or mobile phone having a function of capturing still images.

A CPU (Central Processing Unit) 11 executes a predetermined computer program, and controls the entire operation of the imaging apparatus 1. When, for example, a dynamic body composition mode is selected of composing on one image the dynamic bodies extracted from a plurality of continuously captured images, the CPU 11 controls the CMOS sensor 12 to continuously capture a plurality of images before a shutter button is pushed (hereinafter also referred to as "preview image capturing"), and continuously capture a plurality of images when the shutter button is pushed (hereinafter referred to as "continuous image capturing").

The CMOS sensor 12 photoelectrically converts light which is taken in by a lens, and A/D (Analog/Digital) converts an image signal obtained by photoelectric conversion. The CMOS sensor 12 stores image data obtained by A/D conversion, in the memory 13.

The memory 13 is provided with an area which can store a plurality of preview images captured before the shutter button is pushed, and an area which can store a plurality of images captured after the shutter button is pushed.

Preview images are stored in a preview image area in order of image capturing, and, when there is no more empty area, preview images are sequentially stored by being overwritten on temporally older images. In the preview image area, a plurality of preview images captured immediately before the shutter button is pushed are stored at all times. The preview images stored in the memory 13 are adequately read by the image processing unit 14, and are displayed on a LCD (Liquid Crystal Display) 16. The user can check the composition by looking at a preview image displayed on the LCD 16.

When a dynamic body composition mode is selected, the image processing unit 14 reads an image stored in the memory 13 and composes images. Content of processing performed by the image processing unit 14 and a detailed configuration of the image processing unit 14 will be described below.

A storing unit 15 includes, for example, a memory card which is detachable from the imaging apparatus 1, and stores images generated by the image processing unit 14. The LCD 16 displays a preview image and composition image supplied from the image processing unit 14. An operation unit 17 has various buttons such as a shutter button, and outputs a signal showing content of the user's operation to the CPU 11 when the button is operated.

Figure 2:
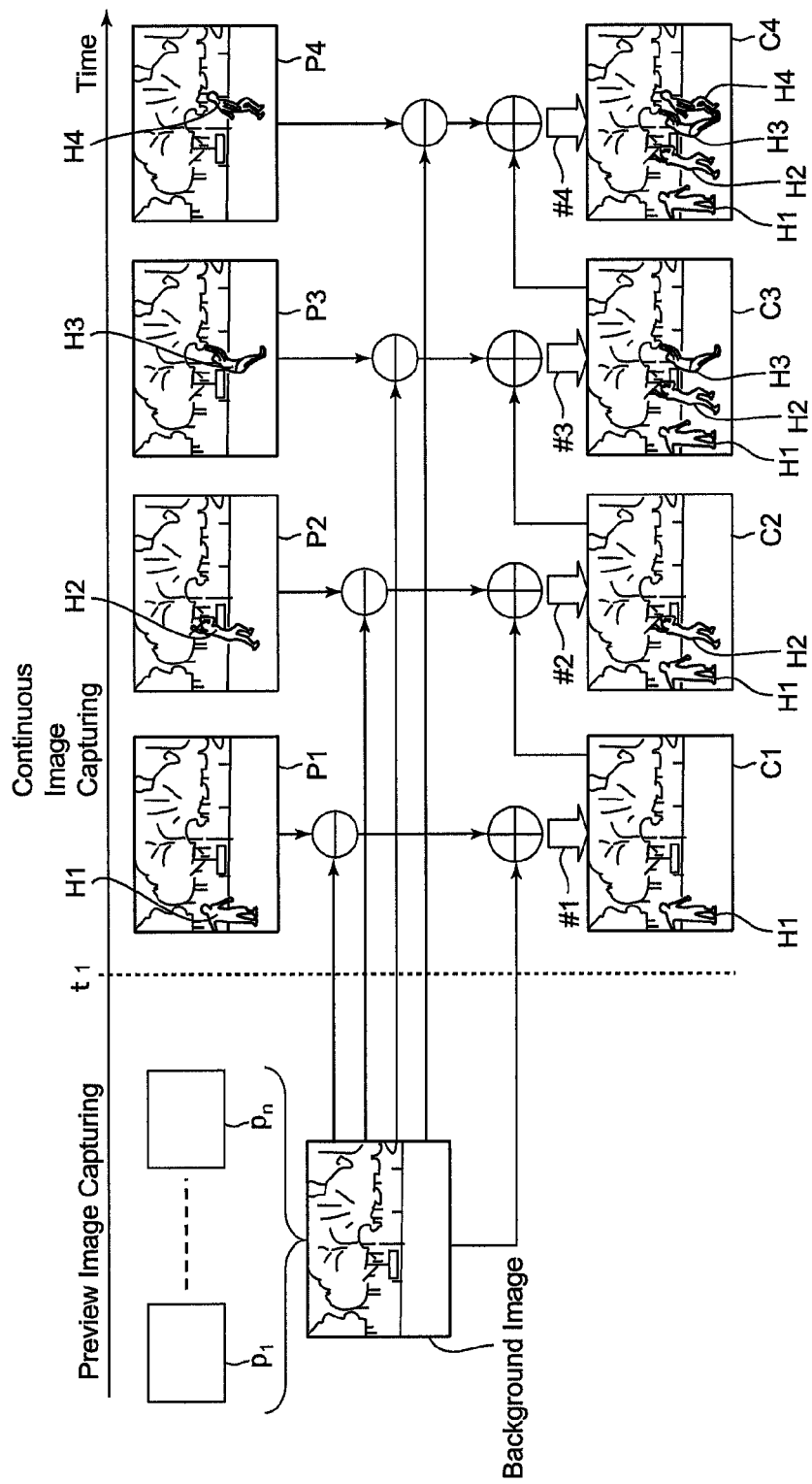
FIG. 2 is a view illustrating a flow of processing performed when a dynamic body composition mode is set.

FIG. 2 is a view illustrating a flow of processing performed upon setting of a dynamic body composition mode.

The horizontal axis in FIG. 2 indicates the time, and a time t1 is a time when the shutter button is pushed. That is, a preview image is obtained by preview image capturing before the time t1, and a plurality of captured images are obtained by continuous image capturing after the time t1. For example, a preview image and captured image are captured in a state where the imaging apparatus 1 is fixed. The respective preview images and captured images show the same scene as a background, and show a dynamic body moving in front of this scene (on the imaging apparatus 1 side).

When the shutter button is pushed, as illustrated in the left of FIG. 2, the image processing unit 14 reads preview images p1 to pn stored in the memory 13 in this case, and generates one background image based on the preview images p1 to pn. The background image is a destination to which a dynamic body image extracted from the captured image is composed, and is, for example, generated such that the median value of the pixel value of the pixel at the same position in the preview images p1 to pn is used as the pixel value of each pixel. The background image only shows the background without showing the dynamic body.

When the background image is generated, the background image may be displayed immediately on the LCD 16 such that the user can check the image which is the destination to which the dynamic body is composed.

When a captured image captured by pushing the shutter button is stored in the memory 13, the image processing unit 14 reads the captured image one by one from the memory 13 in order of image capturing. Reading of the captured image is started in parallel to capturing of the captured image before, for example, a series of image capturing is finished.

With the example of FIG. 2, seven images are captured, and four captured images P1 to P4 selected one by one are sequentially read from the memory 13. The captured images P1 to P4 each show subjects H1 to H4 showing a state upon capturing of each image of a person moving in the same scene as the background.

When the captured image P1 is read from the memory 13, the image processing unit 14 finds the difference between the captured image P1 and background image as shown in the lower part of the captured image P1. The captured image P1 shows the subject H1 and the background of the subject H1 is the same as the scene shown in the background image, and therefore, the pixel having a difference from the background image among pixels of the captured image P1 is a pixel at a portion of the subject H1.

The image processing unit 14 extracts the dynamic body image including pixels corresponding to a portion of the subject H1 from the captured image P1, and generates the composition image C1 indicated at the destination of an arrow #1 by superimposing and composing the dynamic body image on the background image. The composition image C1 is generated by replacing the pixels on which the subject H1 overlaps among the pixels of the background image, with pixels corresponding to the portion of the subject H1 extracted from the captured image P1. The composition image C1 shows the subject H1. When generation of the composition image C1 is finished, the image processing unit 14 displays the composition image C1 on the LCD 16. By this means, the user can check the composed state.

When the captured image P2 captured subsequent to the captured image P1 is read from the memory 13, the image processing unit 14 finds the difference between the captured image P2 and background image as illustrated below the captured image P2. The captured image P2 shows the subject H2 and the background of the subject H2 is the same as the scene shown in the background image, and therefore the pixels having a difference from the background image among the pixels of the captured image P2 are pixels corresponding to the portion of the subject H2.

The image processing unit 14 extracts the dynamic body image including the pixels corresponding to the portion of the subject H2, from the captured image P2 and superimposes and composes the dynamic body image on the composition image C1 which is generated immediately before to generate a composition image C2 indicated at the destination of an arrow #2. The composition image C2 is generated by replacing pixels on which the subject H2 overlaps among the pixels of the composition image C1, with pixels corresponding to the portion of the subject H2 extracted from the captured image P2. The composition image C2 shows the subject H1 and subject H2. When generation of the composition image C2 is finished, the image processing unit 14 displays the composition image C2 on the LCD 16 instead of the composition image C1.

When the captured image P3 captured subsequent to the captured image P2 is read from the memory 13, the image processing unit 14 finds the difference between the captured image P3 and background image as illustrated below the captured image P3. The captured image P3 shows the subject H3 and the background of the subject H3 is the same as the scene shown in the background image, and therefore pixels having a difference from the background image among the pixels of the captured image P3 are pixels corresponding to the portion of the subject H3.

The image processing unit 14 extracts the dynamic body image including pixels corresponding to the portion of the subject H3, from the captured image P3 and superimposes and composes the dynamic body image on the composition image C2 which is generated immediately before to generate the composition image C3 indicated at the destination of an arrow #3. The composition image C3 is generated by replacing the pixels on which the subject H3 overlaps among the pixels of the composition image C2, with the pixels corresponding to the portion of the subject H3 extracted from the captured image P3. The composition image C3 shows the subjects H1 to H3. When generation of the composition image C3 is finished, the image processing unit 14 displays the composition image C3 on the LCD 16 instead of the composition image C2.

When the captured image P4 captured subsequent to the captured image P3 is read from the memory 13, the image processing unit 14 finds the difference between the captured image P4 and background image as illustrated below the captured image P4. The captured image P4 shows the subject H4 and the background of the subject H4 is the same as the scene shown in the background image, and therefore, pixels having a difference from the background image among the pixels of the captured image P4 are pixels corresponding to the portion of the subject H4.

The image processing unit 14 extracts the dynamic body image including pixels corresponding to the portion of the subject H4, from the captured image P4 and superimposes and composes the dynamic body image with the composition image C3 which is generated immediately before to generate the composition image C4 as indicated at the destination of the arrow #4. The composition image C4 is generated by replacing pixels on which the subject H4 overlaps among the pixels of the composition image C3, with pixels corresponding to the portion of the subject H4 extracted from the captured image P4. The composition image C4 shows the subjects H1 to H4. When the composition image C4 is generated, the image processing unit 14 displays the composition image C4 on the LCD 16 instead of the composition image C3.

As described above, by generating the background image which is a destination to which the dynamic body image is composed using a preview image captured before the shutter button is pushed, it is possible to extract the dynamic body image immediately after the captured image is captured, and compose the dynamic body image with the background image to generate a composition image.

That is, when the background image is generated using the captured image captured after the shutter button is pushed, the background image cannot be generated until capturing of the captured image P4 is finished when described using the example of FIG. 2, generation of a composition image can be started at a later timing. However, by generating the background image using a preview image as described above, it is possible to start generating the composition image C1 immediately after capturing of the captured image P1 is finished.

In addition, instead of generating the background image when the shutter button is pushed, every time the preview image is captured and stored in the memory 13, the background image may be generated using a plurality of preview images stored in the memory 13. When the shutter button is pushed, generation of the composition image is started using the background image generated in advance. By so doing, it is possible to, for example, more quickly generate a composition image.

Further, according to the above processing, every time a composition image is generated, it is possible to display the composition image on the LCD 16 and present the image to the user. The composition image may be displayed one by one instead of the composition image generated before as described above or aligned and displayed together with composition images generated before. By so doing, it is possible to, for example, easily check how the images are composed.

It is also possible to generate the composition image using both of a low resolution image and a high resolution image. Meanwhile, the high resolution image (so-called full image) is an image which is captured by the CMOS sensor 12 and which has the same number of pixels as the number of effective pixels of the CMOS sensor 12, and the low resolution image (for example, a quick view image used to check a captured image immediately after image capturing) is an image which is obtained by converting the resolution for the high resolution image.

By generating the composition image using the low resolution image, it is possible to more quickly perform processing compared to a case where a composition image is generated using the high resolution image, and provide quick view display for displaying the composition image at an earlier timing. Respective quick view images which are composition images for quick display generated based on the low resolution image are stored in header information of the main image and stored in the storing unit 15 together with the main image. The main image is, for example, a composition image which is finally generated using the high resolution image (composition image C4 with the example of FIG. 2).

Figure 3:
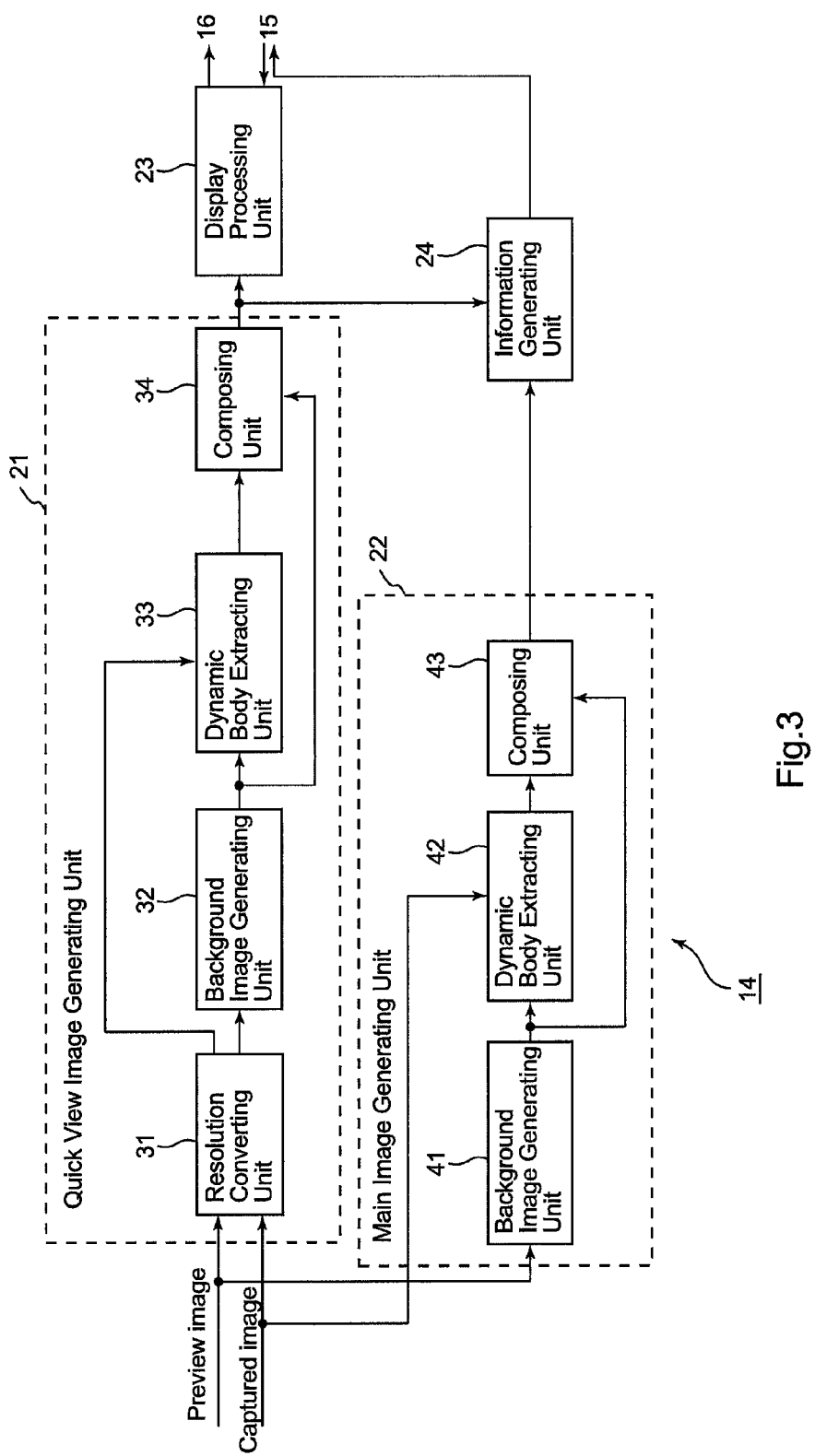
FIG. 3 is a view illustrating a configuration example of the image processing unit in FIG. 1.

FIG. 3 is a view illustrating a configuration example of the image processing unit 14 in FIG. 1. At least part of functional units illustrated in FIG. 3 are realized by executing a predetermined computer program by the CPU 11 in FIG. 1.

The image processing unit 14 has a quick view image generating unit 21, a main image generating unit 22, a display processing unit 23 and an information generating unit 24. The quick view image generating unit 21 has a resolution converting unit 31, a background image generating unit 32, a dynamic body extracting unit 33 and a composing unit 34, and the main image generating unit 22 has a background image generating unit 41, a dynamic body extracting unit 42 and a composing unit 43. The preview image read from the memory 13 is input to the resolution converting unit 31 and the background image generating unit 41, and respective captured images read from the memory 13 every time images are captured are input to the resolution converting unit 31 and the dynamic body extracting unit 42.

The resolution converting unit 31 of the quick view image generating unit 21 converts the input preview image and captured image into low resolution images. In addition, although the resolution of a preview image is converted into a low resolution, there may be cases where the resolution is not converted into a low resolution depending on the resolution of the preview image. The resolution converting unit 31 outputs the preview image of a low resolution obtained by resolution conversion, to the background image generating unit 32, and outputs the captured image of the low resolution to the dynamic body extracting unit 33.

The background image generating unit 32 generates a background image using as the pixel value of each pixel the median value of the pixel value of pixels at the same position in a plurality of low resolution preview images, based on a plurality of low resolution preview images supplied from the resolution converting unit 31. The background image generated by the background image generating unit 32 is supplied to the dynamic body extracting unit 33 and composing unit 34.

The dynamic body extracting unit 33 finds the difference between a low resolution background image supplied from the background image generating unit 32 and a low resolution captured image supplied from the resolution converting unit 31 (difference between pixel values of pixels at the same position). The dynamic body extracting unit 33 extracts from the captured image the dynamic body image including pixels having a difference from the background image, and outputs the dynamic body image to the composing unit 34.

The composing unit 34 composes the low resolution background image which is supplied from the background image generating unit 32, and the dynamic body image which is extracted from the low resolution captured image by the dynamic body extracting unit 33 and is supplied, and generates a composition image which is a quick view image. The dynamic body image is composed with the background image by replacing pixels which overlap the portion of the dynamic body among the pixels of the background image, with the pixels of the dynamic body image. Every time the composition image which is a quick view image is generated, the composing unit 34 outputs the generated composition image to the display processing unit 23 and information generating unit 24.

As described above, the composing unit 34 superimposes and composes on the background image the dynamic body image extracted from the first captured image to generate the first composition image, and superimposes and composes the dynamic body image extracted from respective second and subsequent captured images, on the composition image generated immediately before to generate the respective second and subsequent composition images.

The display processing unit 23 displays the quick view image on the LCD 16 every time the quick view image is supplied from the composing unit 34.

Further, when display of the main image stored in the storing unit 15 is commanded, the display processing unit 23 reads from the storing unit 15 a file of the main image display of which is commanded. The main image file includes main image data and header information, and, in header information, respective quick view image data generated upon generation of the main image is stored. The display processing unit 23 displays quick view images stored in header information of the main image one by one in, for example, the order of generation or aligns and displays a plurality of quick view images on the LCD 16, and displays the main image on the LCD 16.

The background image generating unit 41 of the main image generating unit 22 generates the background image using as the pixel value of each pixel the median value of the pixel value of the pixels at the same position in a plurality of high resolution preview images, based on a plurality of input high resolution preview images. The background image generated by the background image generating unit 41 is supplied to the dynamic body extracting unit 42 and composing unit 43.

The dynamic body extracting unit 42 finds the difference between the high resolution background image supplied from the background image generating unit 41 and the input high resolution captured image. The dynamic body extracting unit 42 extracts from the captured image the dynamic body image including pixels having the difference from the background image, and outputs the dynamic body image to the composing unit 43.

The composing unit 43 performs the same processing as the processing of composing unit 34 of generating quick view images, based on the high resolution background image supplied from the background image generating unit 41 and dynamic body image which is extracted from the high resolution captured image by the dynamic body extracting unit 42 and is supplied.

That is, the composing unit 43 superimposes and composes the dynamic body image extracted from the first captured image, on the background image to generate the first composition image, and superimposes and composes the dynamic body image extracted from the respective second and subsequent captured images, on the composition image generated immediately before to generate the respective second and subsequent composition image. The composing unit 43 composes the dynamic body image extracted from the final captured image, and outputs the generated final composition image to the information generating unit 24 as the main image.

The information generating unit 24 stores in header information the respective quick view images supplied from the composing unit 34, and generates and stores header information and a file including the main image data supplied from the composing unit 43 in the storing unit 15.

Next, image capturing processing of the imaging apparatus 1 will be described with reference to the flowchart in FIG. 4.

Figure 4:
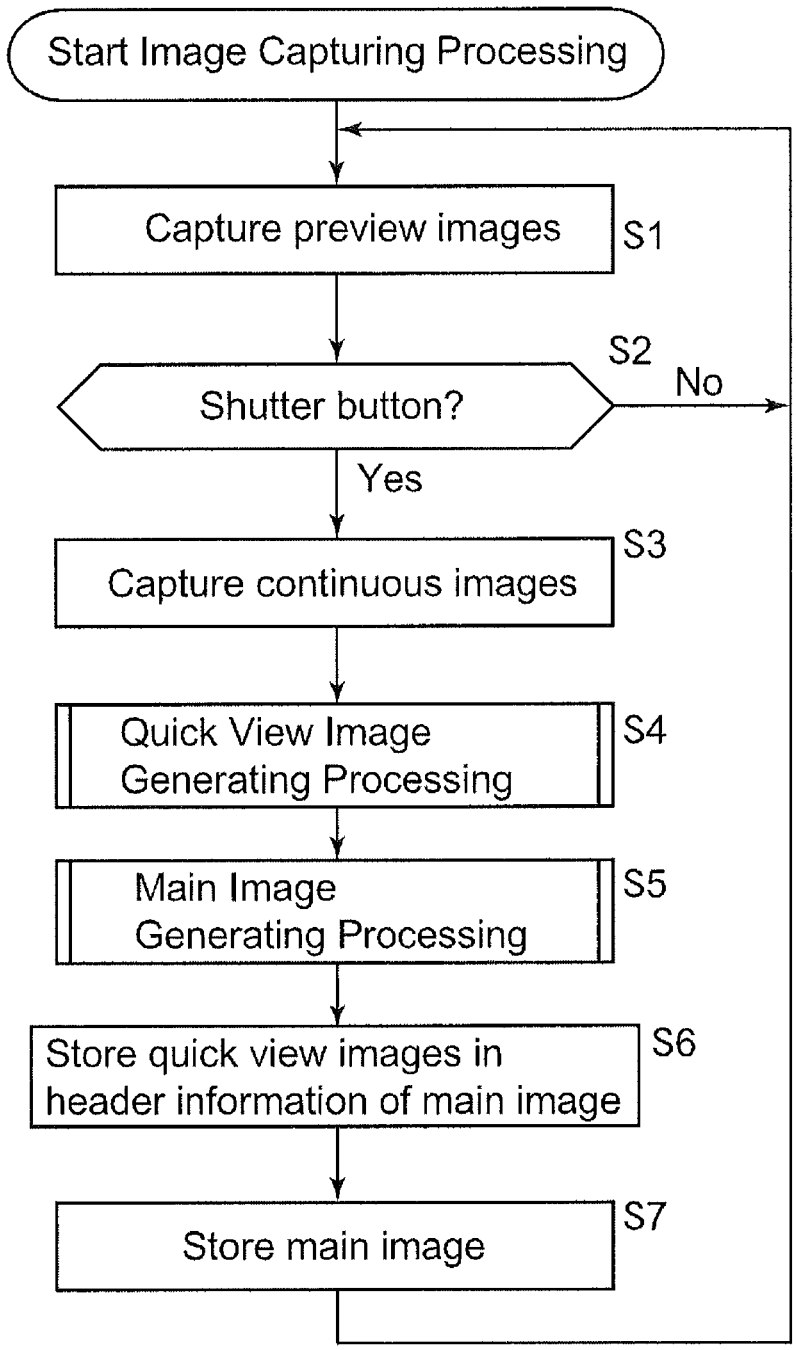
FIG. 4 is a flowchart describing image capturing processing of the imaging apparatus.

The processing in FIG. 4 is started when, for example, the user selects the dynamic body composition mode as an image capturing mode. Processing of each step is not only performed in the order illustrated in FIG. 4 but also adequately performed in parallel to the other processings.

In step S1, the CPU 11 controls the CMOS sensor 12 to capture a plurality of preview images. The captured preview image is supplied to the memory 13 and is stored in the preview image area.

In step S2, the CPU 11 decides whether or not the shutter button is pushed, based on information supplied from the operation unit 17, and, when it is decided that the shutter button is not pushed, the step returns to step S1 to repeat capturing a preview image.

By contrast with this, when it is decided in step S2 that the shutter button is pushed, in step S3, the CPU 11 controls the CMOS sensor 12 to capture a plurality of images by a continuous image capturing function. The captured image is sequentially supplied to the memory 13, and is stored in the captured image area.

In step S4, the quick view image generating unit 21 of the image processing unit 14 performs quick view image generating processing. A plurality of quick view images generated by quick view image generating processing are supplied to the information generating unit 24.

In step S5, the main image generating unit 22 of the image processing unit 14 performs main image generating processing. The final composition image which is the main image generated by the main image generating processing is supplied to the information generating unit 24.

In step S6, the information generating unit 24 stores a plurality of quick view images generated by the quick view image generating processing, in header information of the main image.

In step S7, the information generating unit 24 stores header information in which the quick view images are stored and a file including main image data generated by the main image generating processing, in the storing unit 15. Then, the step returns to step S1 to perform the above processing.

Figure 5:
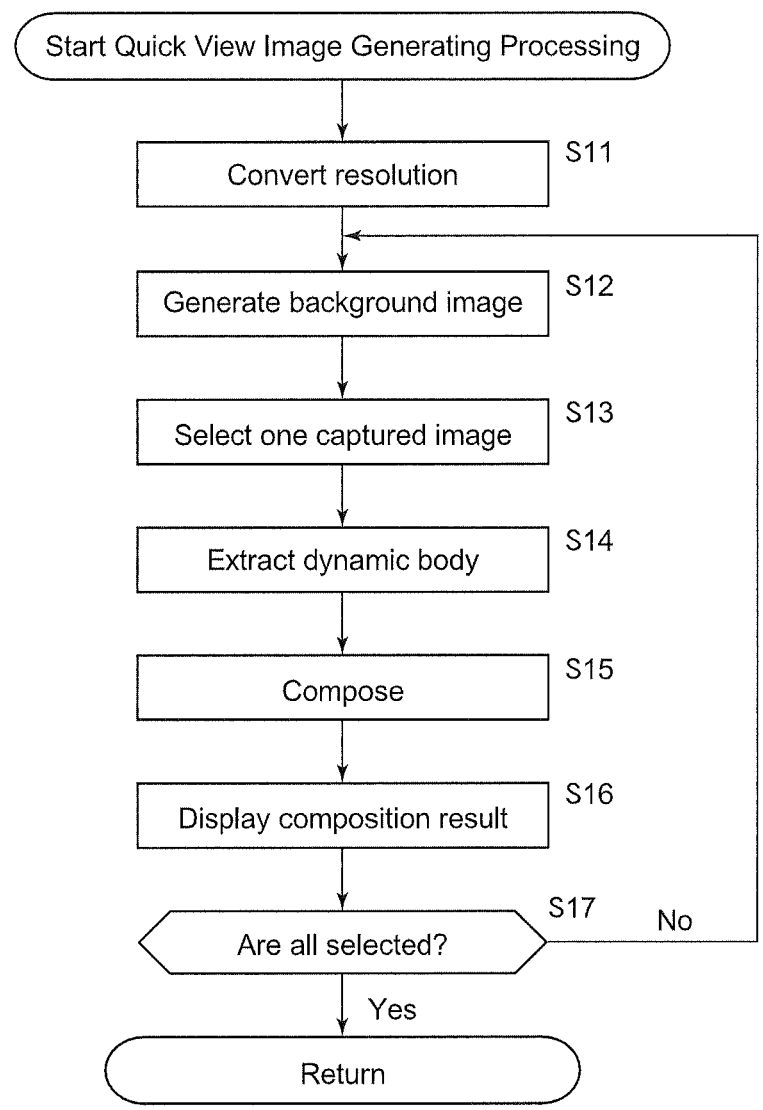
FIG. 5 is a flowchart describing quick view image generating processing performed in step S4 in FIG. 4.

Next, quick view image generating processing performed in step S4 in FIG. 4 will be described with reference to the flowchart in FIG. 5.

In step S11, the resolution converting unit 31 of the quick view image generating unit 21 converts the input preview image and captured image into low resolution images.

In step S12, the background image generating unit 32 generates a background image using as the pixel value of each pixel the median value of the pixel value of the pixel at the same position, based on a plurality of low resolution preview images.

In step S13, the dynamic body extracting unit 33 selects one low resolution captured image obtained by converting the resolution in the resolution converting unit 31.

In step S14, the dynamic body extracting unit 33 finds the difference between the low resolution background image generated by the background image generating unit 32 and the selected low resolution captured image, and extracts from the captured image the dynamic body image including pixels having the difference from the background image.

In step S15, the composing unit 34 composes the low resolution background image generated by the background image generating unit 32 and the dynamic body image extracted from the low resolution captured image by the dynamic body extracting unit 33 to generate a composition image which is a quick view image. The quick view image generated by the composing unit 34 is supplied to the display processing unit 23 and information generating unit 24.

In step S16, the display processing unit 23 displays on the LCD 16 the quick view image generated by the composing unit 34.

In step S17, the dynamic body extracting unit 33 decides whether or not all captured images are selected, and, when it is decided that all captured images are not selected, the step returns to step S13 to select the next captured image and repeat the same processing. The dynamic body image extracted from the first captured image is superimposed and composed on the background image to generate the first composition image and the dynamic body images extracted from the respective second and subsequent captured images are then superimposed and composed on the composition image generated immediately before to generate the respective second and subsequent composition images. The generated composition images are sequentially displayed on the LCD 16, and are supplied to the information generating unit 24.

When it is decided in step S17 that all captured images are selected, the step returns to step S4 in FIG. 4 to perform the subsequent processings.

Figure 6:
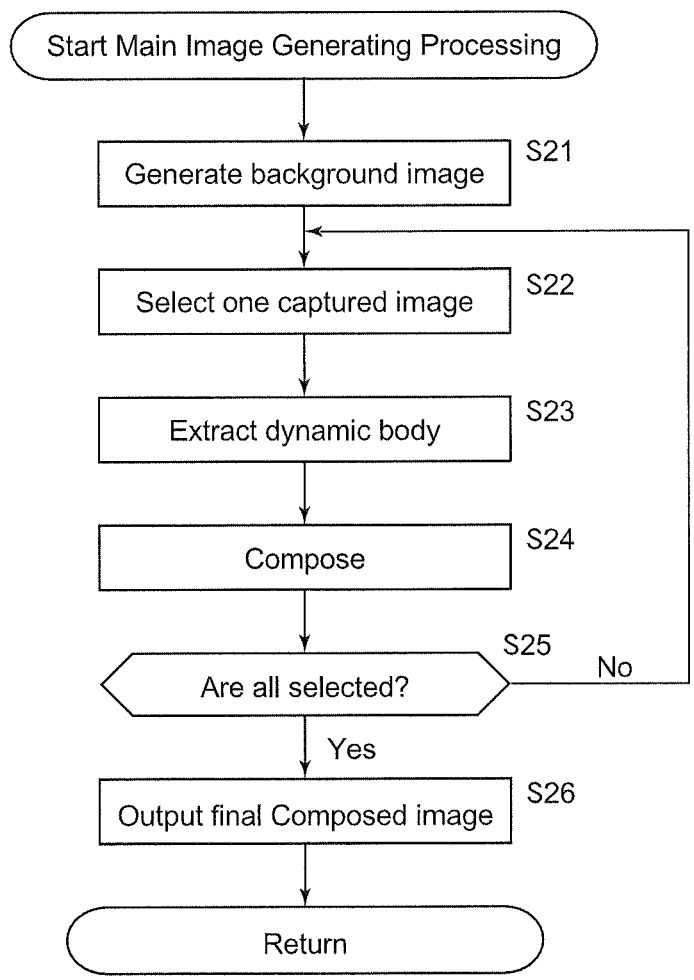
FIG. 6 is a flowchart describing main image generating processing performed in step S5 in FIG. 4.

Next, main image generating processing performed in step S5 in FIG. 4 will be described with reference to the flowchart illustrated in FIG. 6.

In step S21, the background image generating unit 41 of the main image generating unit 22 generates the background image using as the pixel value of each pixel the median value of the pixel value of the pixel at the same position in a plurality of high resolution preview images, based on a plurality of input high resolution preview images.

In step S22, the dynamic body extracting unit 42 selects one input high resolution captured image.

In step S23, the dynamic body extracting unit 42 finds the difference between the high resolution background image generated by the background image generating unit 41 and the selected high resolution captured image, and extracts from the captured image the dynamic body image including pixels having the difference from the background image.

In step S24, the composing unit 43 composes the high resolution background image generated by the background image generating unit 41 and dynamic body image extracted from the high resolution captured image by the dynamic body extracting unit 42 to generate a composition image.

In step S25, the dynamic body extracting unit 42 decides whether or not all captured images are selected, and, when it is decided that all captured images are not selected, the step returns to step S22 to select the next captured image and repeat the same processing. The dynamic body image extracted from the first captured image is superimposed and composed on the background image to generate the first composition image, and the dynamic body images extracted from the respective second and subsequent captured images are then superimposed and composed on the composition image generated immediately before to generate the respective second and subsequent composition images.

When it is decided in step S25 that all captured images are selected, in step S26, the composing unit 43 composes the dynamic body image extracted from the final captured image to output the generated final composition image to the information generating unit 24 as the main image. Then, the step returns to step S5 in FIG. 4 to perform the subsequent processings.

According to the above described exemplary embodiment, following effects are obtained:

1. it is possible to more quickly generate an image in which a plurality of dynamic bodies extracted respectively from a plurality of continuously captured images are composed;

2. It is possible to easily extract a plurality of dynamic body images from the differences between the images before image capturing and a plurality of images after image capturing;

3. By generating the background image using preview images, it is possible to start generating the composition image immediately after the first image is captured. Hence, it is possible to display the composition image every time the composition c image is generated;

4. By storing the finally generated composition image as the high resolution main image, it is possible to display a high quality composition image; and 5. Respective quick view images which are quick view display composition images are stored in header information of the main image, so that it is possible to display the quick view images one by one in, for example, the order of generation, or align and display a plurality of quick view images.

As described above, although a background image generated based on a high resolution preview image is used to generate the main image, the main image may be generated using a low resolution background image generated based on a low resolution preview image upon generation of quick view images.

Further, as described above, although, every time the quick view image is generated, the quick view image is displayed on the LCD 16 and is presented to the user, processing of generating the main image may be cancelled in this case. When, for example, a cancel button which is operated to cancel processing of generating the main image is displayed together with a quick view image and a predetermined button of the operation unit 17 is pushed or a cancel button is pushed by the user in case where a touch panel is overlaid on the LCD 16, the processing of generating the main image is stopped. By so doing, wasteful processing is not executed, so that it is possible to save power consumption.

When respective dynamic bodies shown in one composition image are crowded (are too close to each other), there are cases where the transition of the motion of the dynamic body is hard to learn from the composition image. To prevent the respective dynamic bodies from being crowded, the user may select every what captured image is used among captured images captured by a continuous image capturing function to generate a composition image. By so doing, it is possible to, for example, generate a composition image which the user desires.

Further, it may be possible to capture 3n+1 (for example, 31) captured images by the continuous image capturing function when the shutter button is pushed, extract the dynamic body from each captured image by finding the difference from the background image, calculate the coordinate of the gravity center of the extracted dynamic body and select the dynamic body image to be composed with the background image, according to whether or not the coordinate of the gravity center moves.

When, for example, the coordinate of the gravity center moves, dynamic body images extracted from respective captured images of the first captured image, n+1th captured image, 2n+1th captured image and final captured image are selected and used to generate a composition image. Further, when the coordinate of the gravity center is not moving, respective dynamic body images extracted from a 3n+1th captured image is selected and used to generate a composition image.

By switching the dynamic body image used to generate a composition image according to whether or not the gravity center of the dynamic body moves, it is possible to prevent respective dynamic bodies shown in one composition image from being crowded.

As described above, although a background image is generated based on preview images captured before the shutter button is pushed, the background image may be generated based on the captured image captured after the shutter button is pushed.

Figure 7:
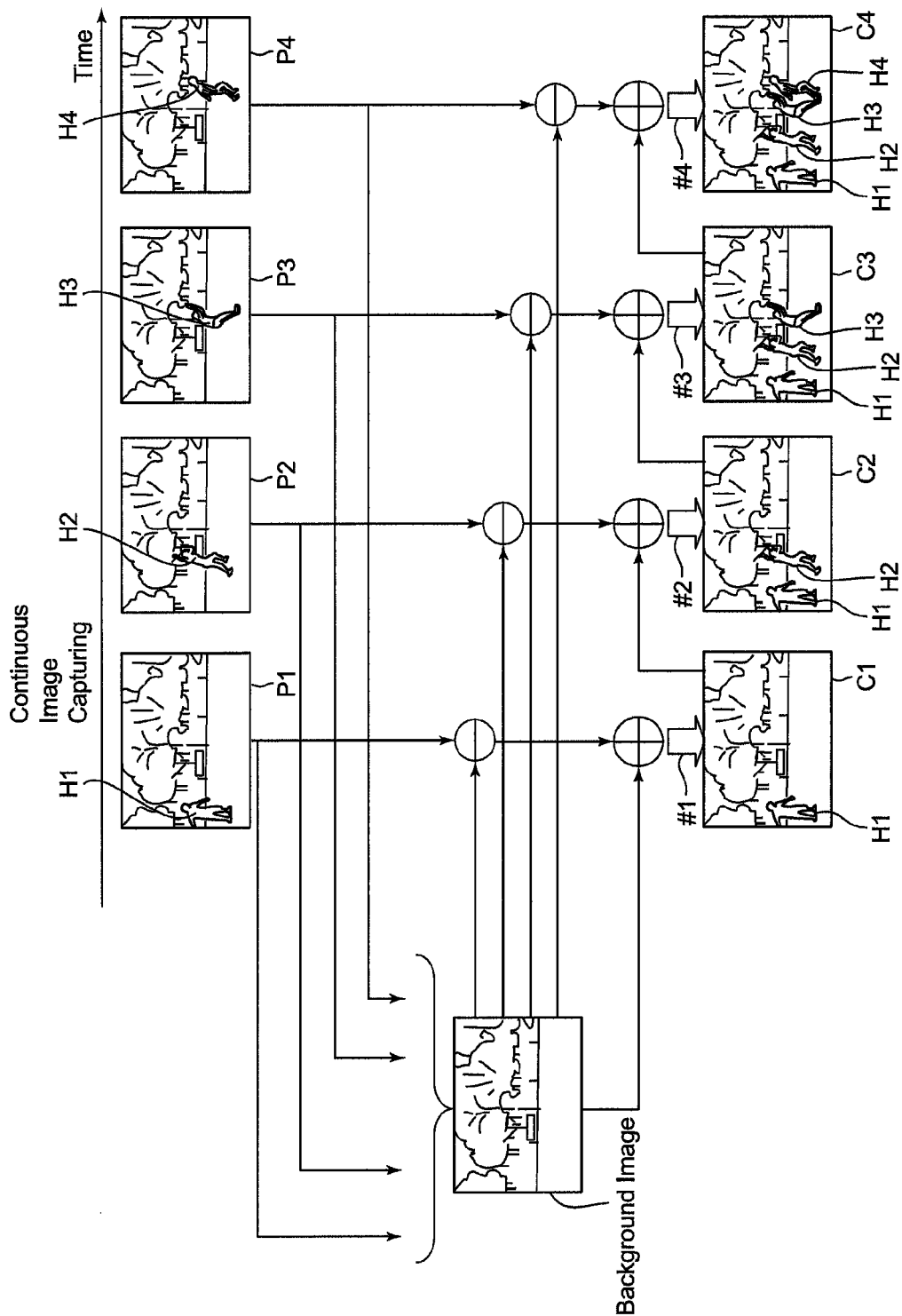
FIG. 7 is a view illustrating a flow of processing of generating a composition image using a background image generated based on the captured image.

FIG. 7 is a view illustrating the flow of processing of generating a composition image using the background image generated based on the captured image.

With the example of FIG. 7, the background image is generated using the median value of the captured images P1 to P4 captured after the shutter button is pushed. Further, by extracting the dynamic body image H1 from the captured image P1 by finding the difference from the background image, and composing the extracted dynamic body image H1 with the background image, the composition image C1 indicated at the destination of the arrow #1 is generated.

Similarly, by extracting the dynamic body images H2, H3 and H4 respectively from the captured images P2 to P4 by finding the difference from the background image, and composing the extracted dynamic body images H2, H3 and H4 with the composition image generated immediately before, the composition images C2 to C4 indicated at the destinations of the arrows #2 to #4 are generated.

As described above, the background image is generated utilizing the captured images, so that it is possible to generate a background image similar to the background when the dynamic body is moving.

The embodiment of the present invention is by no means limited to the above embodiment, and can be variously changed within the scope without deviating from the spirit of the present invention.

What is claimed is:

1. An imaging apparatus comprising:
an image capturing unit which performs continuous image capturing;
a storing unit which stores a plurality of first images captured by the image capturing unit before a shutter button is pushed, and a plurality of second images captured by the image capturing unit after the shutter button is pushed;
a generating unit which generates a background image which is a single still image of a background of a dynamic body included in the first images and second images based on at least the plurality of first images;
an extracting unit which extracts a dynamic body image which is an image of a dynamic body included in the second images by finding a difference between the background image and the second images; and
a composing unit which generates a composition image by superimposing and composing on the background image the dynamic body image extracted from a first one of the second images captured after the shutter button is pushed, and superimposes and composes the dynamic body image extracted from a second or subsequent second images, on the composition image generated by composing the dynamic body image extracted from the second image immediately before to generate a plurality of composition images while maintaining the position relationship of each portion of the dynamic body with the background image.

2. The imaging apparatus according to claim 1, further comprising a display unit which displays the generated composition images every time the composition images are generated.

3. The imaging apparatus according to claim 2, further comprising a processing unit which stores as a main image in a recording medium the composition image generated by composing the dynamic body image extracted from a final one of the second images captured after the shutter button is pushed.

4. The imaging apparatus according to claim 3, further comprising a converting unit which converts the first images and the second images into low resolution images, wherein:
the generating unit generates the background image of a low resolution based on at least the plurality of first images for which a resolution is converted;
the extracting unit extracts the dynamic body image from the respective second images for which a resolution is converted;
the composing unit superimposes and composes on the background image of the low resolution the dynamic body image extracted from the respective second images for which the resolution is converted; and
the processing unit stores in header information of the main image a plurality of low resolution composition images generated by the composing unit to store the main image.

5. The imaging apparatus according to claim 4, wherein, when display of the main image stored in the recording medium is commanded, the display unit sequentially displays the plurality of composition images included in header information of the main image in order of generation by the composing unit.

6. An imaging method comprising:
performing continuous image capturing;
storing a plurality of first images captured before a shutter button is pushed and a plurality of second images captured after the shutter button is pushed;
generating a background image which is a single still image of a background of a dynamic body included in the first images and second images, based on at least the plurality of first images;
extracting a dynamic body image which is an image of a dynamic body included in the second images by finding a difference between the background image and the second images; and
generating a composition image by superimposing and composing on the background image the dynamic body image extracted from a first one of the second images captured after the shutter button is pushed, and superimposing and composing the dynamic body image extracted from a second or subsequent second images, on the composition image generated by composing the dynamic body image extracted from the second image immediately before to generate a plurality of composition images while maintaining the position relationship of each portion of the dynamic body with the background image.

7. A non-transitory computer-readable storage medium storing a computer program that, when executed by a computer, causes the computer to perform:

performing continuous image capturing;

storing a plurality of first images captured before a shutter button is pushed and a plurality of second images captured after the shutter button is pushed; and generating a background image which is a single still image of a background of a dynamic body included in the first images and second images, based on at least the plurality of first images;

extracting a dynamic body image which is an image of a dynamic body included in the second images by finding a difference between the background image and the second images; and generating a composition image by superimposing and composing on the background image the dynamic body image extracted from a first one of the second images captured after the shutter button is pushed, and superimposing and composing the dynamic body image extracted from a second or subsequent second images, on the composition image generated by composing the dynamic body image extracted from the second image immediately before to generate a plurality of composition images while maintaining the position relationship of each portion of the dynamic body with the background image.

* * * * *